US008378782B2

(12) United States Patent
Orr

(10) Patent No.: US 8,378,782 B2
(45) Date of Patent: Feb. 19, 2013

(54) SYSTEM AND METHOD FOR LOCKING AND UNLOCKING ACCESS TO AN ELECTRONIC DEVICE

(75) Inventor: Kevin Orr, Elmira (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 13/350,238

(22) Filed: Jan. 13, 2012

(65) Prior Publication Data

US 2012/0117643 A1 May 10, 2012

Related U.S. Application Data

(63) Continuation of application No. 11/608,282, filed on Dec. 8, 2006, now Pat. No. 8,125,312.

(51) Int. Cl.

| | |
|---|---|
| ***G05B 19/00*** | (2006.01) |
| ***G08B 29/00*** | (2006.01) |
| ***E05B 45/06*** | (2006.01) |
| ***G06F 3/041*** | (2006.01) |
| ***H04N 7/16*** | (2011.01) |
| ***H04L 29/06*** | (2006.01) |

(52) U.S. Cl. ....... 340/5.3; 340/5.31; 340/5.54; 340/543; 340/542; 345/173; 725/28; 713/155

(58) Field of Classification Search ........................ None
See application file for complete search history.

(56) References Cited

U.S. PATENT DOCUMENTS 3,760,299 A 9/1973 Vasile
4,197,524 A * 4/1980 Salem .......................... 340/5.51
5,559,961 A 9/1996 Blonder
6,369,794 B1 4/2002 Sakurai et al.
6,509,847 B1 1/2003 Anderson
2001/0047488 A1 11/2001 Verplaetse et al.
2002/0167699 A1 11/2002 Verplaetse et al.
2005/0022229 A1 * 1/2005 Gabriel et al. .................. 725/28
2005/0024341 A1 2/2005 Gillespie et al.
2005/0288973 A1 12/2005 Taylor et al.
2006/0097983 A1 5/2006 Haggmann
2006/0211499 A1 9/2006 Bengtsson et al.
2006/0259205 A1 * 11/2006 Krum ................................ 701/1
2006/0282660 A1 * 12/2006 Varghese et al. .............. 713/155

* cited by examiner

*Primary Examiner* — Jennifer Mehmood
*Assistant Examiner* — Fekadeselassie Girma
(74) *Attorney, Agent, or Firm* — McCarthy Tétrault LLP

(57) ABSTRACT

The disclosure relates to a system and method for unlocking and unlocking access to a device. The system comprises: a graphical user interface (GUI) module providing instructions to a microprocessor operating on the electronic device and an access management module providing instructions to the microprocessor. The GUI module provides instructions to generate on a display of the electronic device an interface for entry and modification of a tap pattern used to change an access state of the electronic device; and process inputs from an input device through the interface that select described levels of movement and described locations for expected tap signals for the tap pattern. The access management module provides instructions to receive signals from a monitoring circuit in the electronic device that processes a tap signal received from an accelerometer in the electronic device; and determine whether the tap signal completes a match for the tap pattern.

18 Claims, 6 Drawing Sheets

500

SYSTEM AND METHOD FOR LOCKING AND UNLOCKING ACCESS TO AN ELECTRONIC DEVICE

RELATED APPLICATION

This application is a continuation application of U.S. patent application Ser. No. 11/608,282 filed on Dec. 8, 2006 now U.S. Pat. No. 8,125,312.

FIELD OF DISCLOSURE

The disclosure described herein relates to a system and method for selectively providing and inhibiting access to an electronic device, i.e., locking and unlocking the device. In particular, the disclosure described herein relates to using a detected movement of a device in a prescribed pattern to lock and/or unlock access to one or more features of the device.

BACKGROUND

Current wireless handheld mobile communication devices perform a variety of functions to enable mobile users to stay current with information and communications, such as e-mail, corporate data and organizer information while they are away from their desks. The devices may contain sensitive information. Frequently it is useful to provide a locking/unlocking system to such a device that selectively allows a person to access the device as it is prone to being lost or stolen.

Known locking/unlocking systems include password routines and biometric scanners. To lock a device in an existing system, a user presses a specific shortcut key or unlocks the device via a menu option. To unlock a device, a user must type in a password via the keypad. These prior art systems can be cumbersome to use.

There is a need for a system and method which addresses deficiencies in the prior art.

BRIEF DESCRIPTION OF THE DRAWINGS

Embodiments of the disclosure will now be described, by way of example only, with reference to the accompanying drawings, in which.

DETAILED DESCRIPTION OF AN EMBODIMENT

Figure 1:
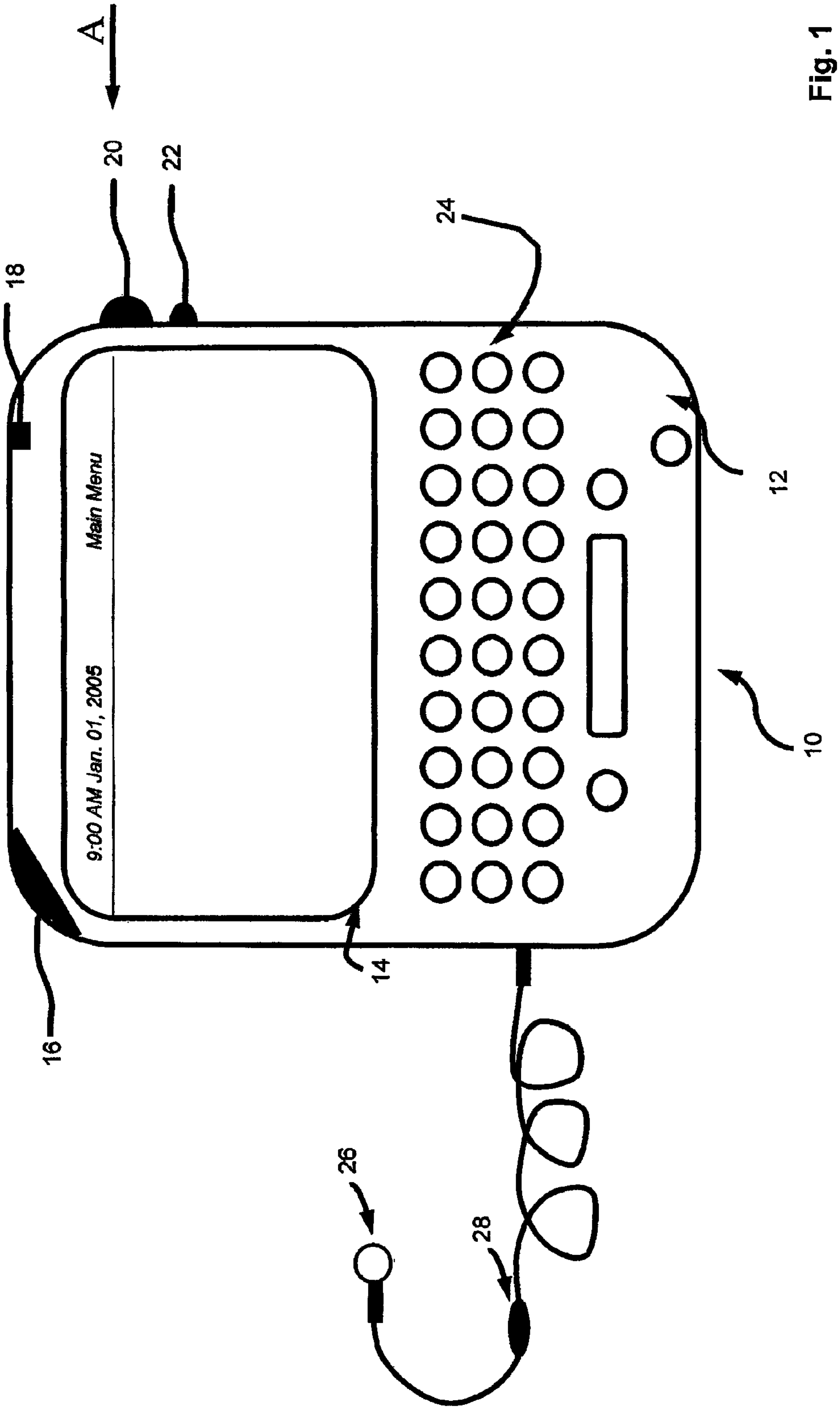
FIG. 1 is a schematic representation of an electronic device having an access system in accordance with an embodiment.

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

In a first aspect, an access management system for an electronic device is provided. The system comprises: a graphical user interface (GUI) module providing instructions to a microprocessor operating on the electronic device and an access management module providing instructions to the microprocessor. The GUI module provides instructions to generate on a display of the electronic device an interface for entry and modification of a tap pattern used to change an access state of the electronic device; and process inputs from an input device on the electronic device through the interface that select described levels of movement and described locations for expected tap signals for the electronic device for the tap pattern including a first level of movement and a second level of movement, where the second level of movement is larger than the first level of movement. The access management module provides instructions to receive signals from a monitoring circuit in the electronic device that processes a tap signal received from an accelerometer in the electronic device; and determine whether the tap signal completes a match for the tap pattern.

In the system, when determining whether the tap signal completes the match, the access management module may further provide instructions to the microprocessor to utilize one or more of a location, a magnitude and a time spacing characteristic of the tap signal compared to a previously received tap signal to determine whether the tap signal completes the match.

In the system, the access management module may further comprise a signal filter to distinguish the tap signal from other movements detected by the accelerometer.

In the system, the access management module may utilize a first peak value in the tap signal to compare against the tap pattern; and may disregard a second peak value following the first peak value in the tap signal for comparing against the tap pattern.

In the system, the access management module may disregard the tap signal if the tap signal exceeds a certain duration.

In the system, the tap pattern may be a locking pattern; and the access management module may change the access state to a locked state if the tap signal completes the match, where the locked state prohibits access to at least one application operating on the electronic device.

In the system, the tap pattern may be an unlocking pattern; and the access management module may change the access state to an unlocked state if the tap signal completes the match, where the unlocked state allows access to at least one application operating on the electronic device.

In the system, the access management module may provide for subsequent entry of a text password as part of a subsequent access request to enter a further access state of the electronic device providing access to at least one additional application operating on the electronic device.

In the system, the tap pattern may comprise at least two tap signals at first and second locations on a case of the electronic device.

In the system, the described levels of movement may include at least one of a light tap level, a medium tap level and any tap level.

In the system, the described locations may include at least one of a back of the electronic device, a front of the electronic device and a side of the electronic device.

In a second aspect, a method for controlling access to applications operating on an electronic device is provided. The method comprises: generating a GUI providing a screen on a display of the electronic device that provides an interface for entry and modification of a tap pattern used to change an access state of the electronic device; through the GUI, processing inputs from an input device on the electronic device that select described levels of movement and described locations for expected tap signals for the electronic device for the tap pattern, including a first level of movement and a second level of movement, where the second level of movement is larger than the first level of movement; receiving signals from a monitoring circuit in the electronic device that processes tap signals from an accelerometer in the electronic device; and determining whether the tap signal completes a match for the tap pattern.

In the method, determining whether the tap signal completes the match may comprise filtering the tap signal to isolate the tap signal from signals when the electronic device is being moved while it is being tapped.

In the method, determining whether the tap signal completes the match may comprise disregarding the tap signal if the tap signal exceeds a certain duration.

In the method, determining whether the tap signal completes the match may comprise: utilizing a first peak value in the tap signal to compare against the tap pattern; and disregarding a second peak value following the first peak value in the tap signal for comparing against the tap pattern.

The method may further comprise changing the access state to a locked state if the tap signal completes the match, the locked state prohibiting access to at least one application operating on the electronic device.

The method may further comprise changing the access state to an unlocked state if the tap signal completes the match, the unlocked state allowing access to at least one application operating on the electronic device.

The method may further comprise providing subsequent entry of a text password as part of a subsequent access request to enter a further access state of the electronic device providing access to at least one additional application operating on the electronic device.

In the method, the tap pattern may comprise a series of positive and negative vibrating, degrading pulses.

In the method, the tap pattern may comprise at least two tap signals at first and second locations on a case of the electronic device.

In another aspect, an access management system for an electronic device is provided. The system comprises: a sensor providing a tap signal; a monitoring circuit connected to the sensor to process aspects of the tap signal; and an access management module operating on the device receiving the tap signal from the monitoring circuit to evaluate the tap signal against a preset tap pattern and to change an access state of the device if the tap signal completes a match for the tap pattern.

In the system, a tapping on a case of the device may be the tap signal; and the sensor may be an accelerometer that is designed to detect the tapping.

The system may further comprise a signal filter to isolate the tap signal from other movements detected by the accelerometer. Also, the signal filter may disregard the tap signal if the tap signal does not have a sufficient magnitude or pulse width.

The system may further comprise an application operating on the device providing a GUI allowing initial tap configuration or modifications to be made to the tap pattern on the device.

In the system, the preset tap pattern may be a locking pattern; and the access state may be changed to a locked state if the tap signal completes a match for the tap pattern, where the locked state prohibits access to at least one application operating on the device.

Additionally or alternatively, in the system, the preset tap pattern may be an unlocking pattern; and the access state may be changed to an unlocked state if the tap signal completes a match for the tap pattern, where the unlocked state allows access to at least one application operating on the device. Also, the preset tap pattern may utilize parameters selected from any combination of: a defined time separation between taps, a detected location of a tap and a magnitude of a tap. Further still, the access state may allow for subsequent entry of a subsequent access request to enter a further access state of the device, where the further access state provides access to at least one additional application operating on the device. The subsequent access request may be a second access tap pattern. Alternatively, the subsequent access request may be a text-type password entry provided to the device by another input system such as a keypad or touchscreen.

In still another aspect, a method for controlling access to applications operating on an electronic device is provided. The method comprises: monitoring for a tap signal imparted on the device; evaluating the tap signal against a preset tap pattern; and changing an access state of the device if the tap signal completes a match for the tap pattern.

The method may further comprise filtering the tap signal to isolate the tap signal from other signals when the device is being moved while it is being tapped.

The method may further comprise disregarding the tap signal if the tap signal does not have a sufficient magnitude or pulse width.

In the method, the preset tap pattern may be a locking pattern; and the access state may be changed to a locked state if the tap signal completes a match for the tap pattern, where the locked state prohibits access to at least one application operating on the device.

Additionally or alternatively, in the method the preset tap pattern may be an unlocking pattern; and the access state may be changed to an unlocked state if the tap signal completes a match for the tap pattern, where the unlocked state allows access to at least one application operating on the device.

In the method, the preset tap pattern may utilize parameters selected from any combination of: a defined time separation between taps, a detected location of a tap and a magnitude of a tap.

The method may further allow for subsequent entry of a subsequent access request to enter a further access state of the device that provides access to at least one additional application operating on the device. The subsequent access request may be a second access tap pattern. Alternatively, the subsequent access request may be a text-type password entry provided to the device by another input system such as a keypad or touchscreen.

In other aspects, various combinations of sets and subsets of the above aspects are provided.

Generally, an embodiment provides a system and method of allowing and controlling access to an electronic device. First, consider a device that is “locked”, where only a small subset of features is accessible to a user. The user needs to “unlock” the device to use it. The “key” to unlocking the device is to trigger the sensors on the device in a manner that matches the device’s predetermined “unlocking” pattern. In the device, a monitoring circuit monitors for a specific activation of a sensor or input device. When the sensor is activated, it generates a tap signal that is provided to an activation management module. The module then evaluates the tap signal. If it matches a predetermined “unlocking” signal, then the device is "unlocked" and additional access can be provided to additional features of the device. When the device is in an "unlocked" state, it can then be placed into a "locked" state by entry of a specific locking signal that is detected by the device.

In one embodiment, "unlocking" and "locking" signals are used to access the device is a preset tapping pattern, such as a series of taps in an expected timed sequence.

Exemplary details of embodiments are provided herein. First, a description is provided on general concepts and features of an embodiment. Then, further detail is provided on control features relating to the access system.

FIG. 1 provides general features of a portable, electronic device in accordance with an embodiment, which is indicated generally at 10. Device 10 is based on a computing platform having functionality of an enhanced personal digital assistant with a cellphone. Device 10 can receive and transmit electronic communications, such as email, SMS and wireless voice communications. Electronic device 10 can be based on construction design and functionality of other electronic devices, such as smart telephones, desktop computers, pagers or laptops having telephony equipment. In a present embodiment, electronic device 10 includes a housing 12, an LCD 14, speaker 16, an LED indicator 18, a trackball 20, an ESC ("escape") key 22, keypad 24, a telephone headset comprised of an ear bud 26 and a microphone 28. Trackball 20 and ESC key 22 can be inwardly depressed along the path of arrow "A" as a means to provide additional input to device 10. Although trackball 20 is shown on the side of device 10, in other implementations, it may be placed on the front of device 10. It will be appreciated that trackball 20 may be augmented or replaced with another input means, including a trackwheel. It will be understood that housing 12 can be made from any suitable material as will occur to those of skill in the art and may be suitably formed to house and hold all components of device 10. The term housing is interchangeable with the term case.

Device 10 can have a fairly small form factor, allowing it to be easily held and manipulated in one hand. Frequently, a holster for device 10 is provided, but not used. As such, with a single-hand operation of device 10 being common place, it can be readily apparent that a system and method providing a physically simple means to lock and unlock device 10, even using only one hand, would be embraced by users.

A typical orientation for a user is to hold device 10 in his palm of one hand, and to support device 10 among his thumb and his last three fingers. In this orientation, his index finger is free to move. As such, this finger (or any other free finger) can tap against the back of housing 12 of device 10. Additionally or alternatively, taps may be made on the front, sides, top or bottom of device 10. It will be appreciated that detection and analysis of a series of taps by the user provides an easy mechanism to lock and unlock access to device 10. Use of a tapping interface eliminates the need for the user to look for a specific key or button to access device 10, although the tapping interface can be used in addition to existing password access systems on device 10.

A tapping pattern can be recognized as a series of inputs received on device 10. A sensor within the device can be provided and accompanying software, firmware and/or hardware is provided by an embodiment to monitor for and interpret such tap(s) to evaluate whether a "password" is being "tapped" into device 10 and whether the "password" is correct. Similarly, when the device is being used with full access to its functions, the device can be "locked" by tapping a "locking" pattern on the case. With the tapping interface, locking or unlocking access to device 10 can be done quickly, such as while device 10 is being brought to or removed from the pocket of the user as he holds it in his hand. Also, device 10 can provide a learning routine to allow the user to provide a tapping input to define a locking or unlocking signal through a graphical user interface, similar a GUI used for text passwords known to those of skill in the art. A three-axis accelerometer with sufficient +/−g-force sensitivity and bandwidth and set thresholds may be employed to detect the vibration peaks which would occur from tapping the device. Generally, a finger tap motion is done at a relatively slow frequency so it can be distinguished from vibrator or other types of vibrations.

For the locking pattern, while any pattern can be used, it is preferably simple enough to be remembered, but complex enough to not be easily mimicked and to prevent false positive patterns. For example, a locking pattern may be as simple as two taps in a defined time period. While the locking pattern may be a single tap, a single tap may lead to false positives, such as an inadvertent nudge causing device 10 to be incorrectly locked. The locking pattern may or may not be identical to the unlocking pattern. For the unlocking pattern, an "unlock" tap pattern may be used for the access "password", which may replace or augment a traditional text-type password.

The tap pattern may be recognized independent of device orientation. As a variance however, the device may be expected to be held in a specific orientation, such as on its side, and then a tap pattern may be applied. In this instance, an activation monitoring module may be programmed to monitor for a specific "g" static acceleration level on all of the significant axis before accepting the tap pattern. The tap pattern may incorporate expected taps from different locations on the device (e.g. a first tap from the back of device 10, a second tap from the left side and a third tap from the front). Combinations of tap patterns and locations may be used.

The tapping interface may provide a first access step in a multiple password system. In a two-step access system, a tapping interface can be used to allow a user to access a certain subset of data or applications on device 10. An additional, traditional text password interface may be provided to control access to additional data or applications. Other variations are possible. For example, to initially turn on a "locked" device 10, a two-stage tap password system may be deployed. To first activate device 10 when it is first picked up, a "two-tap" password may be required to initially activate display 14 of device 10 and activate an "unlock" screen. To access the full application set of device 10, an access password may be required to be "tapped" or a text password may be required to be entered.

Further detail is provided on components of device 10. Device 10 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit-switched phone calls. Ear bud 26 can be used to listen to phone calls and other sound messages and microphone 28 can be used to speak into and input sound messages to device 10.

Figure 2:
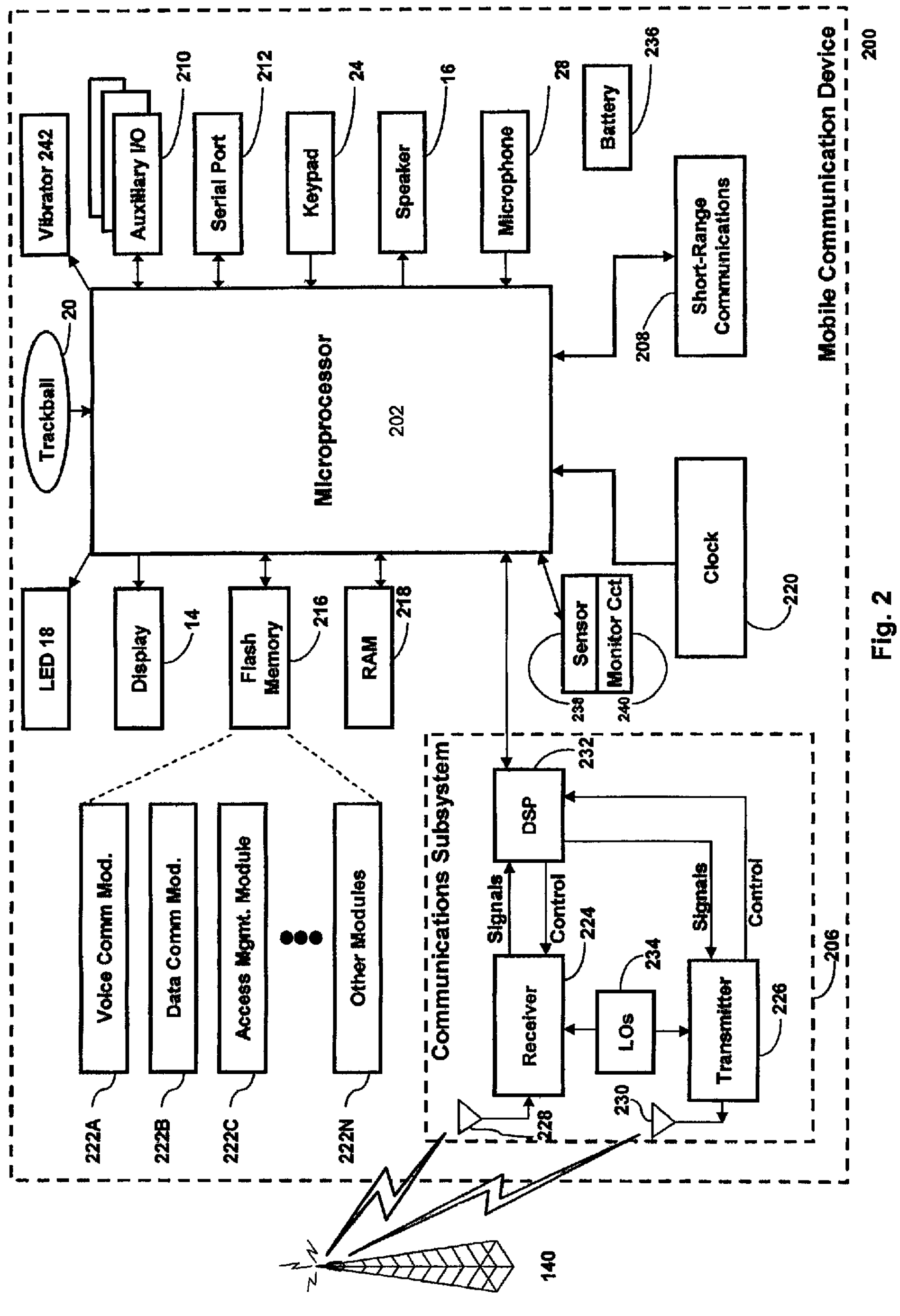
FIG. 2 is a block diagram of certain internal components and the access system in the device in FIG. 1.

Referring to FIG. 2, functional components of device 10 are provided in schematic 200. The functional components are generally electronic, structural or electro-mechanical devices. In particular, microprocessor 202 is provided to control and receive almost all data, transmissions, inputs and outputs related to device 10. Microprocessor 202 is shown schematically as coupled to keypad 24 and other internal devices. Microprocessor 202 preferably controls the overall operation of the device 10 and its components. Exemplary microprocessors for microprocessor 202 include Data 950 (trade-mark) series microprocessors and the 6200 series microprocessors, all available from Intel Corporation. Microprocessor 202 is connected to other elements in device 10 through a series of electrical connections to its various input and output pins. Microprocessor 202 has an IRQ input line which allows it to receive signals from various devices. Appropriate interrupt firmware is provided which receives and reacts to the signals detected on the IRQ line.

In addition to the microprocessor 202, other internal devices of the device 10 are shown schematically in FIG. 2. These include: display 14; speaker 16; keypad 24; communication sub-system 206; short-range communication sub-system 208; auxiliary I/O devices 210; serial port 212; microphone port 214 for microphone 28; flash memory 216 (which provides persistent storage of data); random access memory (RAM) 218; clock 220 and other device sub-systems (not shown). Device 10 is preferably a two-way radio frequency (RF) communication device having voice and data communication capabilities. In addition, device 10 preferably has the capability to communicate with other computer systems via the Internet.

Operating system software executed by the microprocessor 202 is preferably stored in a computer-readable medium, such as flash memory 216, but may be stored in other types of memory devices, such as read-only memory (ROM) or similar storage element. In addition, system software, specific device applications, or parts thereof, may be temporarily loaded into a volatile store, such as RAM 218. Communication signals received by the mobile device may also be stored to RAM 218.

Microprocessor 202, in addition to its operating system functions, enables execution of software applications on device 10. A set of software (or firmware) applications, generally identified as applications 222, that control basic device operations, such as voice communication module 222A and data communication module 222B, may be installed on the device 10 during manufacture or downloaded thereafter. Access management module (AMM) 222C is software that controls access to device 10. As well, additional software modules, such as software module 222N, which may be for instance a personal information manager (PIM) application, may be installed during manufacture or downloaded thereafter into device 10. Data associated with each application can be stored in flash memory 216.

Communication functions, including data and voice communications, are performed through the communication sub-system 206 and the short-range communication sub-system 208. Collectively, sub-systems 206 and 208 provide the signal-level interface for all communication technologies processed by device 10. Various applications 222 provide the operational controls to further process and log the communications. Communication sub-system 206 includes receiver 224, transmitter 226 and one or more antennas, illustrated as receive antenna 228 and transmit antenna 230. In addition, communication sub-system 206 also includes processing modules, such as digital signal processor (DSP) 232 and local oscillators (LOs) 234. The specific design and implementation of communication sub-system 206 is dependent upon the communication network in which device 10 is intended to operate. For example, communication sub-system 206 of device 10 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 10. In any event, communication sub-system 206 provides device 10 with the capability of communicating with other devices using various communication technologies, including instant messaging (IM) systems, text messaging (TM) systems and short message service (SMS) systems.

In addition to processing communication signals, DSP 232 provides control of receiver 224 and transmitter 226. For example, gains applied to communication signals in receiver 224 and transmitter 226 may be adaptively controlled through automatic gain-control algorithms implemented in DSP 232.

In a data communication mode, a received signal, such as a text message or Web page download, is processed by the communication sub-system 206 and is provided as an input to microprocessor 202. The received signal is then further processed by microprocessor 202 which can then generate an output to display 14 or to an auxiliary I/O device 210. A device user may also compose data items, such as e-mail messages, using keypad 24, trackball 20 and/or some other auxiliary I/O device 210, such as a touchpad, a rocker switch, a trackball or some other input device. The composed data items may then be transmitted over communication network 140 via communication sub-system 206. Sub-system 206 may also detect when it is out of communication range for its remote systems.

In a voice communication mode, overall operation of device 10 is substantially similar to the data communication mode, except that received signals are output to speaker 16, and signals for transmission are generated by microphone 28. Alternative voice or audio I/O sub-systems, such as a voice message recording sub-system, may also be implemented on device 10. In addition, display 14 may also be utilized in voice communication mode, for example, to display the identity of a calling party, the duration of a voice call, or other voice call-related information.

Short-range communication sub-system 208 enables communication between device 10 and other proximate systems or devices, which need not necessarily be similar devices. For example, the short-range communication sub-system may include an infrared device and associated circuits and components, or a Bluetooth (trade-mark) communication module to provide for communication with similarly enabled systems and devices.

Powering the entire electronics of the mobile handheld communication device is power source 236. In one embodiment, the power source 236 includes one or more batteries. In another embodiment, the power source 236 is a single battery pack, especially a rechargeable battery pack. A power switch (not shown) may be provided as an “on/off” switch for device 10. A power source interface (not shown) may be provided in hardware, firmware, software or a combination of such elements to selectively control access of components in device 10 to power source 236. Upon activation of the power switch an application 222 is initiated to turn on device 10. Upon deactivation of the power switch, an application 222 is initiated to turn off device 10. Power to device 10 may also be controlled by other devices and by software applications 222. When in a “locked” state, power application 222 may be initiated to selectively provided power to one or more modules or applications operating on device 10, depending on the level of activation of device 10.

Further detail is now provided on aspects of an embodiment relating to control of access to device 10. For the embodiment, an access system is provided by monitor circuit 240, sensor 238 and AMM 222C. Briefly, monitor circuit 240 is used with sensor 238 to detect a sufficient movement or activation of sensor 238 to provide a tap signal to AMM 222C. Once the signal is received, the tap signal can be evaluated by AMM 222C. Additional signal processing may be done by AMM 222C. Depending on the state of operation of AMM 222C, device 10 may activate all of its functions or certain subsets thereof. In other embodiments, monitor circuit 240 and sensor 238 may be provided in separate modules.

Figure 3:
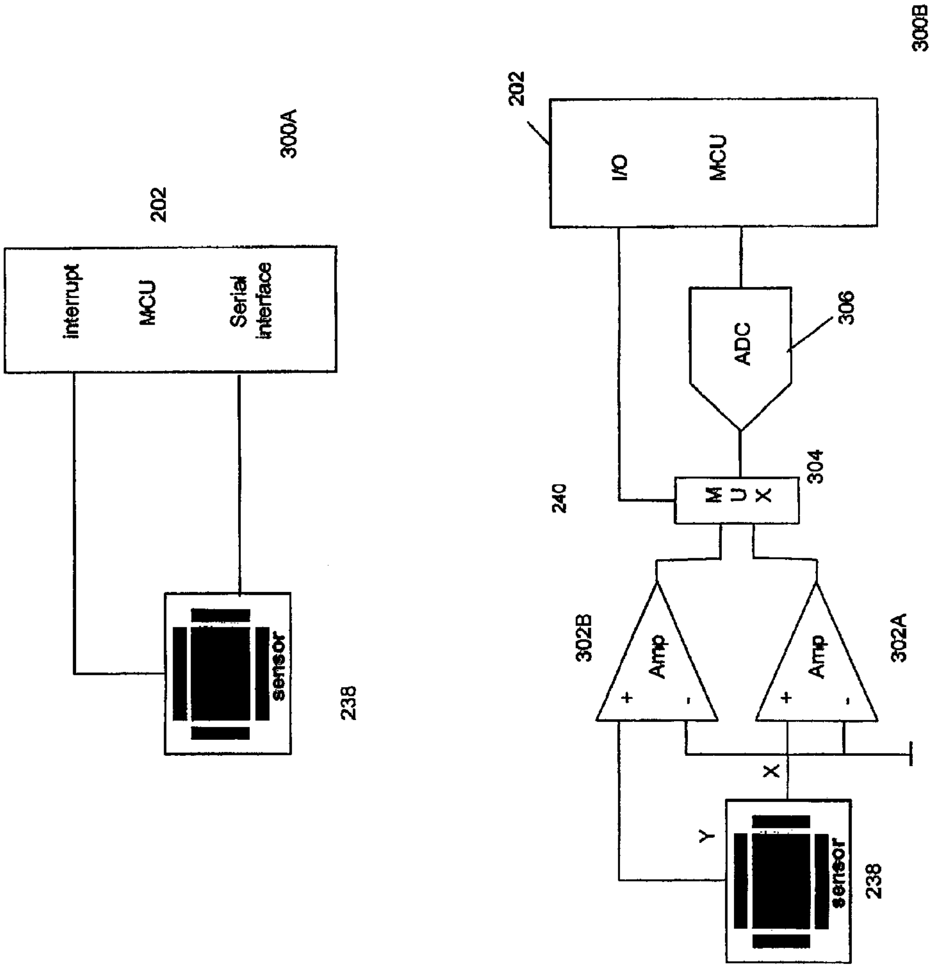
FIG. 3 is a block diagram of two alternative detection systems of the embodiment of FIG. 1.
Figure 4:
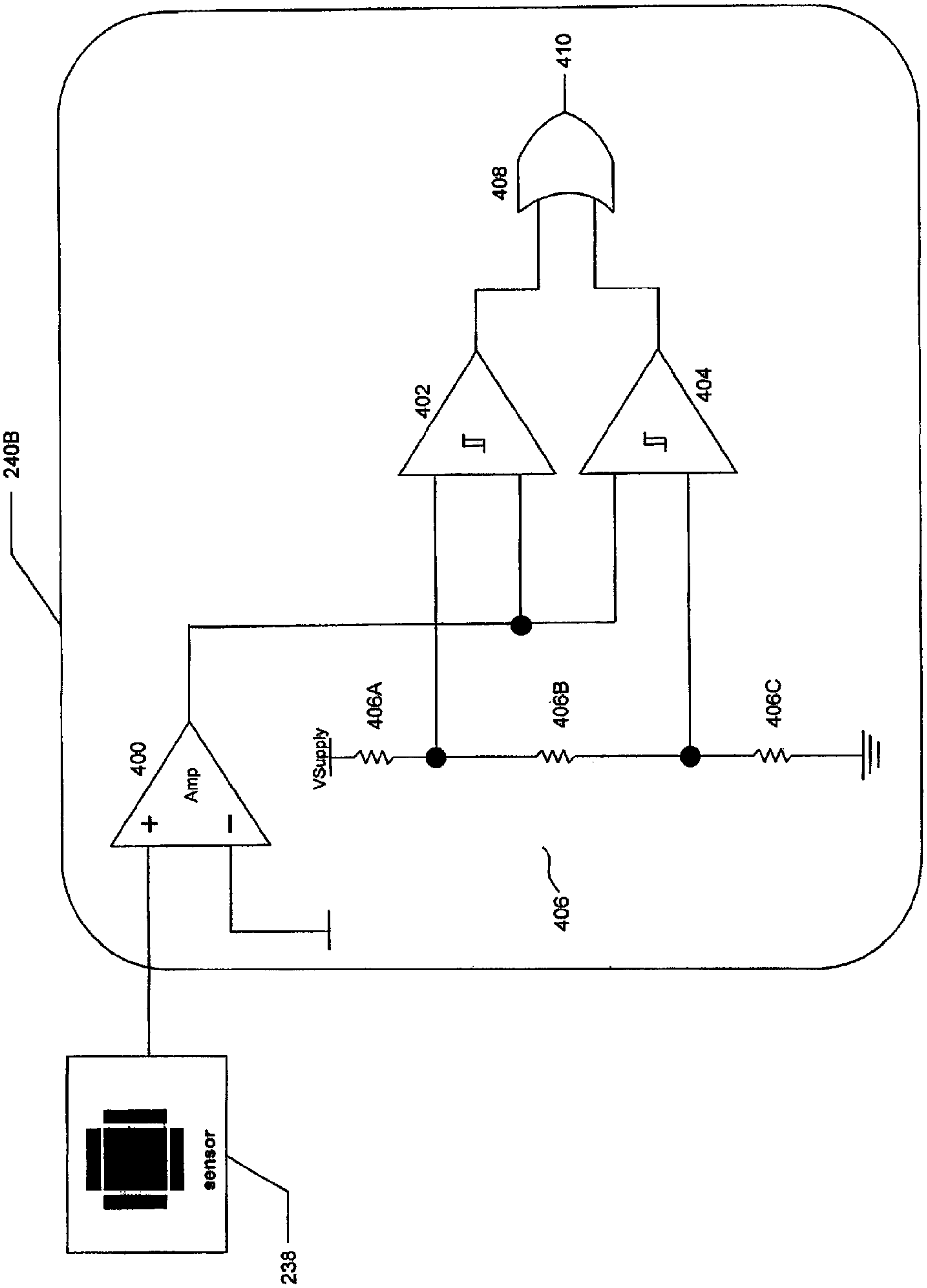
FIG. 4 is a block diagram of another alternative detection system the embodiment of FIG. 1.

Referring to FIGS. 3 and 4, three exemplary monitoring circuits for a sensor are provided. Generally, the controlling circuits utilize a motion sensor to monitor for tap signal(s) made on device 10. Any design using one or more sensors could be implemented. For any embodiment, a low-g MEMS (micro-electromechanical system) accelerometer may be used for sensor 238. Further, the accelerometer may be of almost any type, including a capacitive, piezoelectric, piezoresistive, or a gas-based accelerometer. An exemplary low-g MEMS accelerometer is a LIS3L02AQ tri-axis analog accelerometer, available from STMicroelectronics of Geneva, Switzerland. Accelerometers sense and convert an acceleration detected from a motion (e.g. tilt, inertial, or vibration) or gravity into an electrical signal (producing a corresponding change in output) and are available in one, two or three axis configurations. Accelerometers may produce digital or analog output signals.

Referring to FIG. 3, two basic sensor arrangements for device 10 are shown. Circuit 300A shows a digital output sensor 238 directly connected to the interrupt and serial interface input lines of microprocessor 202. Accordingly, software operating on microprocessor 202 is provided to selectively monitor signal(s) from sensor 238 to determine whether a notable tap, shake or movement of device 10 has been detected. Here the monitoring circuit comprises microprocessor 202. The circuit between sensor 238 and microprocessor 202 can be considered to be one version of circuit 240. The output may be a magnitude signal or a pulse width signal, representing the value of the detected g-force in the acceleration. Circuit 300B shows an analog output sensor 238 connected to two differential comparators 302A and 302B, which then have their outputs attached to an analog mux 304. The mux selectively provides its output according to a control signal generated by microprocessor 202. The analog output of mux 304 is converted to a set of digital signals by analog to digital converter 306, which then provides the output to microprocessor 202. As with other implementation, software operating on microprocessor 202 determines when a notable signal has been generated by sensor 238.

Referring to FIG. 4, an alternative monitoring circuit 240B is shown for analog output sensor 238 which is aligned as a single axis analog sensor. Sensor 238 can be oriented such that its output detects movement along a desired axis (e.g. 'Z' axis detecting when device moved vertically). Additional axes may be monitored by replicating circuit 240B for each additional axis. Briefly, the output of sensor 238 is provided to buffer amp 400. The output of buffer amp 400 is provided in tandem to comparators 402 and 404. The other inputs of comparators 402 and 404 are taken from different taps on resistor ladder 406, comprising resistors 406A, 406B and 406C. Comparators 402 and 404 each produce upper and lower limit comparison signals for the output of sensor 238. If the value of the signal from sensor 238 is either above the upper limit set by the parameters of comparator 402 (comparing the signal from sensor 238 against its tap from the resistor ladder 406) or below the lower limit set by the parameters of comparator 404 (comparing the signal from sensor 238 against its tap from the resistor ladder 406), then OR gate 408 generates a signal 410. It will be appreciated that the limits can be used to define a range of signals detected by sensor 238 representing when device 10 is stationary (e.g. at rest) or has been "tapped". As such, an acceleration of device 10 that is caused by a movement of the device (e.g. shaking, nudging, dropping etc.) may have a sufficient magnitude of acceleration to cause a threshold on the comparator to be crossed generating a positive output from OR gate 408. The AMM 222 may provide additional circuits and systems to evaluate and mitigate these false positives by examining the duration and magnitude of the signal to determine if it meets the signal criteria of a valid tap. Also, AMM 222 may provide a look-ahead timed window to look for the next tap event to occur based on the tap pattern information. If no follow-up tap event occurs, then the first trigger may be ignored.

For example, if device 10 is lying on a flat, horizontal surface, a trigger condition for the Z-axis of sensor 238 can be set to trigger after detecting a force greater than 1 g. When device 10 is picked up, two changes in velocity are detected along the Z-axis of sensor 238: first, a positive acceleration is detected (e.g. a force greater than 1 g) when device 10 is first picked up and is being raised from the surface; and second, a negative acceleration is detected as device 10 is brought to a given height above the surface and movement of device 10 slows down to hold it at that height. If sensor 238 is a digital device, it preferably produces a positive range of values, for example between 0 and 255, representing all detected up and down movements. In that example, the rest reading for sensor 238 for device 10 may be a value around 127. As such, up and down movements of device 10 would cause readings to move above and below the value of 127 (representing 1 g if device is sitting flat). If a movement in either direction is sufficient to trigger one of comparators 402 and 404, the reading on sensor 238 would have to be outside the tolerance window of the rest reading. Thus, OR gate 408 would generate a HIGH signal when the output signal from sensor 238 is outside the tolerance window. It will be appreciated that acceleration limits (such as of 1 g) may be used with a tolerance buffer to compensate for noise in the signals. Typically, tapping a device will cause a sufficient enough spike that a suitable accelerometer would measure around +/−6 g or beyond. In other embodiments, positive and negative values produced by sensor 238 may be analyzed.

Further, if sensor 238 and circuit 240 use only one accelerometer, then the output of OR gate 408 can be used as tap signal 410. In other embodiments, a single comparator can be used to perform comparisons.

It will be appreciated that other embodiments can use other monitoring and/or detection circuits, including staged-activation circuits that will provide power of sensor 238 only after a certain activation signal is provided. For such circuits, a separate "power down" input line or command can be associated with the main sub-system of the accelerometer. An exemplary integrated device is a LIS3L02DQ tri-axis accelerometer having an I2C or SPI interface, also available from STMicroelectronics.

It will be appreciated that other circuits using different combinations of sensors and triggering components and threshold detectors may be used to provide functionalities of sensor 238 and circuit 240. Additionally, sensor 238 and circuit 240 may be integrated as a single part solution. An alternative embodiment may use a different stimulus having a different sensor (e.g. a proximity sensor) to activate a trigger circuit. As such, in other embodiments, sensor 238 may be replaced with other types of vibrational sensors or combined with a different device, such as a spring-loaded switch, an infrared sensor, a capacitive touch sensor, a proximity sensor, a location sensor, a presence detector, a mercury switch, a microphone, a light sensor or any other device which can generate a signal responsive to a stimulus condition predetermined to evaluate whether the device should be locked or unlocked. It will be further appreciated that other motion sensor management circuits known in the art may be used, as appropriate. In other embodiments, additional circuits may be implemented for circuit 240 to provide additional access control features. For the sake of convenience and not limitation, all of the above noted types of specific sensors are generically referred to as a "sensor". Also, DSP 232 may be programmed to provide some computing facilities to interpret signals from AMM 222C.

To improve sensitivities of sensor 238, its outputs can be calibrated to compensate for individual axis offset and sensitivity variations. Calibrations can also be performed at the system level, providing end-to-end calibration. Calibrations can also be performed by collecting a large set of measurements with the device in different orientations.

Figure 5:
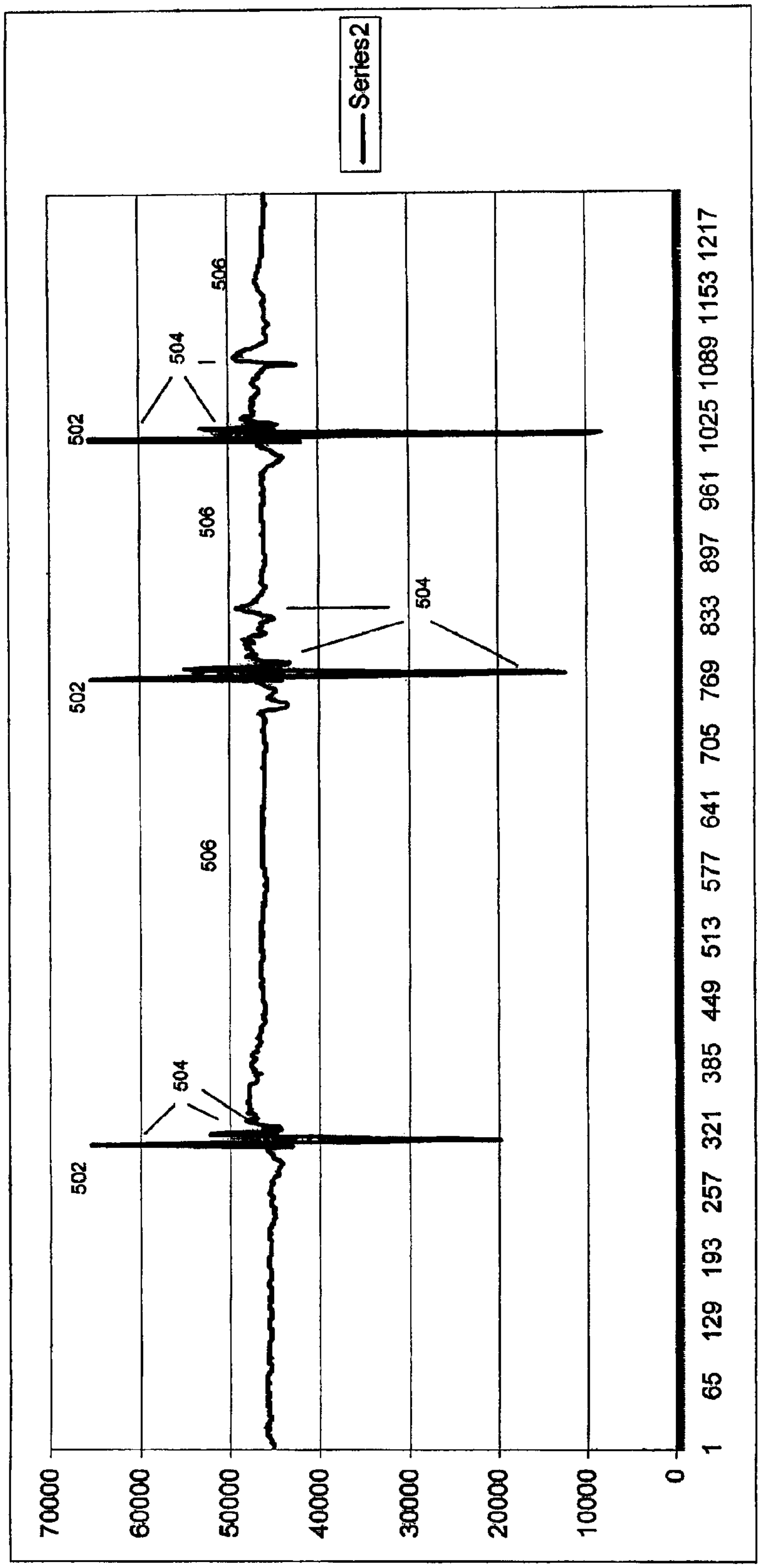
FIG. 5 is a graph illustrating an exemplary set of signals detected by motion detection system of FIG. 3 or 4.

Referring to FIG. 5, graph 500 shows spikes registered by an exemplary sensor 238 when device 10 is tapped in a series of three taps, with time shown in the x-axis and the y-axis indicating the amount of force detected by sensor 238. The sensor may be a LISLV02DQ accelerometer from STMicroelectronics. The numeric output of sensor 238 may be configured to provide data in a range between 0 and 65535, where a +/−2 g force movement can be detected. On this scale, a rough g-value may be as follows: approximate scaling has the reading 65536 indicating approximately 2 g's of force; the reading 49152 indicating approximately 1 g of force; the reading 32768 indicating approximately 0 g of force; the reading 16384 indicating approximately −1 g of force; and the reading 0 indicating approximately −2 g of force. It will be appreciated that other scales and values may be calibrated for other sensors.

For the sake of illustration, each tap is a single, upward strike by an index finger on the back of housing 12 of device 10 near the top while it is being held in one hand set at an angle with the display pointed towards the user (i.e. an "in-use" position). Each tap is roughly of the same force. The time spacing between consecutive taps is different, indicating a certain pattern for the three taps as a whole. More or less taps may be used to define a tap pattern. Graph 500 shows taps 502 each being registered as a series of detected positive and negative vibrating, degrading pulses 504. The degrading pulses may be caused by natural resonances of housing 12 when it is tapped. A set of pulses is detected in each of the y direction of sensor 238. Similar graphs, would be generated for x and z axis directions, although smaller amplitudes would be generated for sensors in the x direction. The time spacing 506 between each pulse notes the time spacing between each tap. As such, it can be seen that quantitative measurements can be made for a series of taps, which can be measured.

A pattern for locking or unlocking device 10 can be defined and calibrated as a series of signals expected to be received by sensor 238. Calibrations and adjustments can be made for different time parameters (e.g. slowly entered taps or quickly entered taps) and magnitude qualities (e.g. loud or soft taps), such that if the pattern of the tap is repeated, but either at a slower or faster than speed of the expected tap pattern, adjustments can be made to compare the pattern apart from its overall duration characteristics. Additional calibrations for one or more of the directions may be made for the location of the tap (e.g. whether it is on the top, back or sides of device 10). Different taps may be expected to be at different locations for a particular pattern. Different magnitudes for a tap may be expected. It would be the relative spacing between the taps that would be important for making a comparison against the expected sequence. One or more of such parameters can be used to define a repeatable password to lock or unlock device 10. As the taps can be quantified as data, different data analysis and signal processing techniques can be applied to the data set to filter out unwanted noise, make adjustments to scale the pattern in the time domain (either to expand or contract the time length of the signals) and other features. Such manipulations and evaluations may be done by algorithm operating on processor 202 or by DSP 234. These features can be assessed by one or more components in an embodiment.

Figure 6:
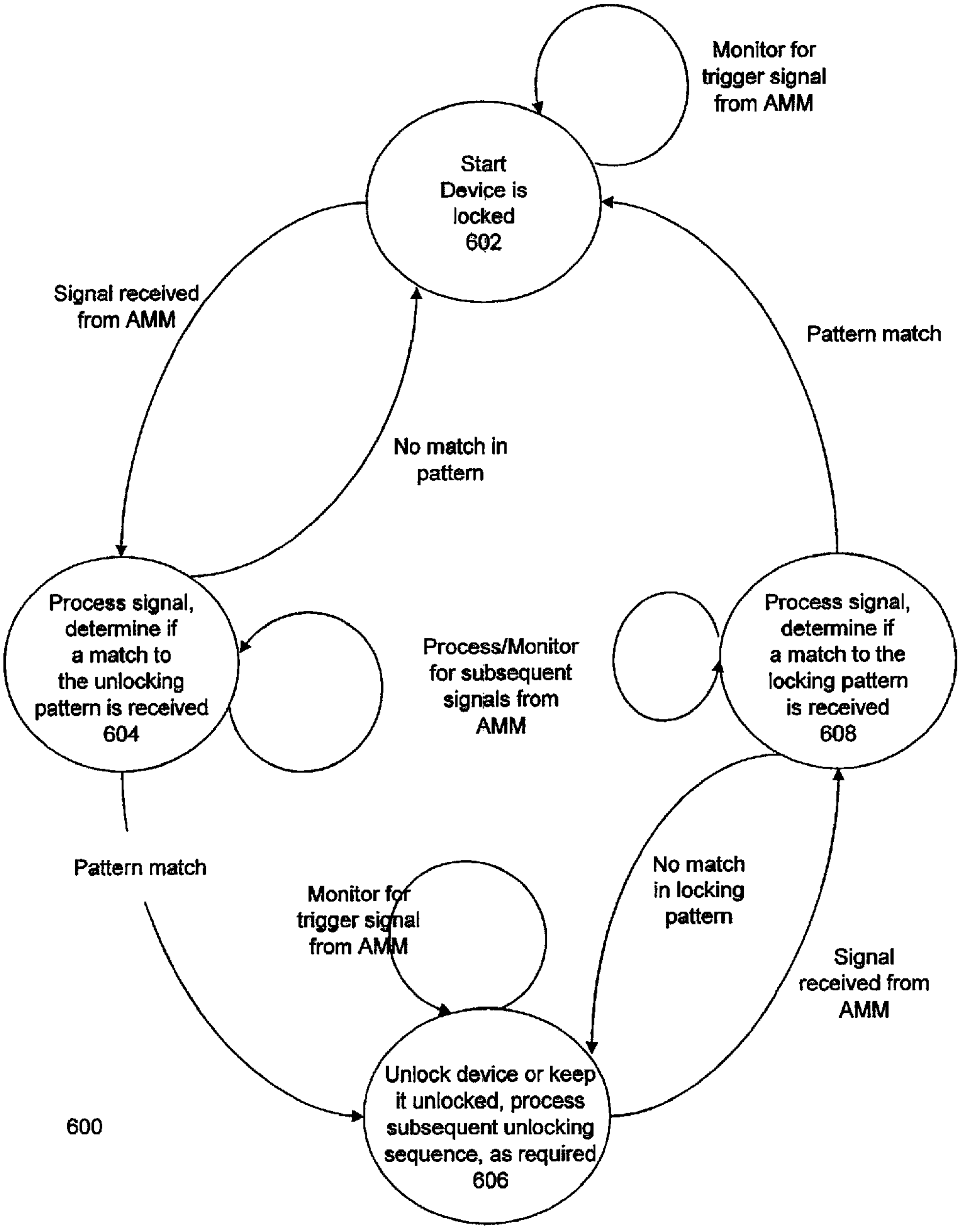
FIG. 6 is a state diagram of an access management module executed by the embodiment of FIG. 1.

Referring to FIG. 6, further detail on the operation of the system and method of an embodiment is provided by description of exemplary states that AMM 222C progresses through during operation of device 10. It will be appreciated that AMM 222C may operate in the background of an application on device 10. Process 600 illustrates as a state diagram, transitions of states of AMM 222C. AMM 222C may be an interrupt-based procedure, a polling-based procedure or may be incorporated into one or more applications 222 themselves. AMM 222C can send and receive status messages to devices and applications on device 10.

In general, at state 602 AMM 222C is activated and device 10 is in a "locked" state. As such, device 10 does not allow a user to access the applications 222 until device 10 is unlocked. In state 602, device 10 monitors for a tap signal from AMM 222C and remains in state 602 until a tap signal is received. Once a tap signal is received from AMM 222C, the process progresses to state 604. In state 604, the initial signal from the AMM 222C is received and it is evaluated to determine whether the received tap completes a match for the "unlocking" pattern required to unlock device 10. In state 604, device 10 and AMM 222C process and monitor for subsequent signals received from the AMM 222C. If a subsequent signal is received and it is determined that there is no match to the unlocking pattern, then the process returns to state 602. If there is a match to the "unlocking" pattern, then the process progresses to state 606.

In state 606, the device 10 is unlocked. Also, if a (optional) subsequent unlocking sequence is required, (e.g., a further keyboard input) then access to a subset of the full set of applications is provided. If the optional subsequent evaluation stage is required, then once the user provides a successful entry of that subsequent unlocking sequence, then device 10 provides further access to further applications in device 10.

However, for a process which does not require a further unlocking sequence, in state 606, device 10 and AMM 222C monitors for a subsequent locking signal from AMM 222C. If an initial locking signal is received from AMM 222C, then the process progresses to state 608.

In state 608, the device 10 processes the signal and determines if a match to a "locking" pattern is being received. As further signals are received from the AMM 222C, process 608 further evaluates the received tap to determine whether it completes a match for the locking pattern. If no match is found for the "locking" pattern, then the process returns to state 606. If there is a pattern match, then the process moves back to state 602, where the device is once again locked. At such time, the device can be unlocked again with a subsequent successful entry of an unlocking pattern, as described earlier.

It will be appreciated that processes, procedures and thresholds for unlocking and locking device 10 can be separate processes. As such, locking and unlocking processes may be separately enabled or disabled. For example, in one scenario, locking of device 10 may be provided by a "two-tap" detection procedure, while unlocking of device 10 may be provided through password entry via keypad.

In establishing process 600, the following variables and setting may be established:

- a timer may be used to determine when and/or whether significant "taps" have been imparted on housing 12 within allowable time limits;
- threshold(s) for sensor 238 need to be established. In a typical configuration, one threshold may be used for all axes of sensor 238;
- an interrupt routine may be established for microprocessor 202 when one of sensor 238 determines that one the thresholds is exceeded, thereby starting the timer;
- the pulse width of the tap is monitored to determine whether the input signal from sensor 238 is a "true" tap or a static acceleration signal, which may be generated by a steady movement of device 10;
- if the pulse width is sufficiently "short", then it is considered to be a "tap"; and
- further monitoring is then initiated for a next "tap", as per process 600.

It will be appreciated that variations on process 600 may be provided where the locked and unlocked access states are entered and left upon receipt of different triggering signals.

Further detail is now provided other aspects of an embodiment. AMM 222C provides an interface to the user of device 10 to define operational aspects of the tap processing systems used to control access to one or more applications and/or systems on device 10. Operational controls may be provided through a series of graphical user interfaces (GUIs) that are generated by AMM 222C and displayed on display 14. As per typical GUIs, the user of device 10 can navigate through a particular GUI that provides one or more selection options using a trackball 20 and keypad 24 or any other input device. Alternatives for a selection option can also be entered through trackball 20 and/or keypad 24.

The user is provided with GUIs generated on device 10 to provide options for controlling operation of AMM 222C and various programming modes for AMM 222C and circuit 240. Such GUIs allow AMM 222C to control and set the level, duration, location, magnitude, pattern and type of signal that is used to lock and/or unlock access to device 10. A single GUI application may be provided to control screens and process, retrieve and store access patterns.

AMM 222C also provides an interface that allows a user to determine parameters for identifying an acceptable tap signal when signals are received from circuit 240. For example, the GUI may provide a selection of minimum movements detected by motion sensor 238 for the threshold circuit 306 (FIG. 3). Such movements can be translated into a set of described levels of movement (e.g. "light tap", "medium tap", and "any tap level") and locations ("back", "front", "side" of device). Similar selections can be provided for minimum requirements for other types of motion detectors. Data relating to such tap characteristics may be stored in memory 216. It will be appreciated that if sensor 238 can detect and distinguish "taps" from different areas of housing 12, (e.g. its back, front, top, bottom or sides), then "taps" for these areas may be used to establish a "signature" for an "unlocking" pattern.

It will be appreciated that baseline sensitivities for a motion sensor may be programmed or learned by device 10. For example, if device 10 is being used while in a car or while the user is jogging, there may be a certain amount of ambient movement detected by sensor 238. Through a routine that periodically reads signals detected by sensor 238, an average "baseline" movement signal can be determined for when device 10 is at "rest" (i.e. a normalized net resting position for its current environment). As such, any movement signal is compared against the baseline movement signal to determine a "normalized" movement of device 10, as adjusted for its current environment.

The embodiment provides adjustment and calibration of such baseline sensitivities through AMM 222C and a GUI. In the GUI, the user is provided with an option for the device 10 to take baseline measurements for a selectable period of time and is further provided the option to use the baseline measurement when analyzing additional signals from the motion sensor 238.

In an embodiment, a specific gesture detected by sensor 238 and/or sub-system 304 may be provided to lock or unlock device 10, such as a quick "snap" movement in a certain direction of device 10 or the movement of device 10 in a clockwise circular pattern. That gesture can be broken down into a series of sequential notable components. As the gesture is being executed by a user with device 10 in hand, sensor 238 detects each component of the gesture, and each component is analyzed to determine by software operating on microprocessor 202 whether the gesture has been properly formed, and thereafter provide a signal to activate device 10.

It will be appreciated that the manual taps as described herein may be provided by a user's finger; however, it will be appreciated that any suitable sufficient movement of the device, use of a tool (such as by a pencil), or other movement of the device against an object (such as rapping the device against a desk) may be used to input a tap signal or part of a tap signal.

The present disclosure is defined by the claims appended hereto, with the foregoing description being merely illustrative of embodiments of the disclosure. Those of ordinary skill may envisage certain modifications to the foregoing embodiments which, although not explicitly discussed herein, do not depart from the scope of the disclosure, as defined by the appended claims.

The invention claimed is:

1. An access management system for an electronic device, comprising:

a non-transitory computer-readable memory including computer processing instructions for a microprocessor on the electronic device, the computer-readable memory comprising a graphical user interface (GUI) module providing instructions to the microprocessor to generate on a display of the electronic device an interface for entry and modification of a tap pattern used to change an access state of the electronic device; and process inputs from an input device on the electronic device through the interface that select described levels of movement and described locations for expected tap signals for the electronic device for the tap pattern including a first level of movement and a second level of movement, where the second level of movement is larger than the first level of movement; and an access management module providing instructions to the microprocessor to receive signals from a monitoring circuit in the electronic device that processes a tap signal received from an accelerometer in the electronic device; and determine whether the tap signal completes a match for the tap pattern by utilizing a first peak value in the tap signal to compare against the tap pattern; and disregarding a second peak value following the first peak value in the tap signal for comparing against the tap pattern.

2. The access management system for an electronic device as claimed in claim 1, wherein when determining whether the tap signal completes the match, the access management module further provides instructions to the microprocessor to:

utilize one or more of a location, a magnitude and a time spacing characteristic of the tap signal compared to a previously received tap signal to determine whether the tap signal completes the match.

3. The access management system for an electronic device as claimed in claim 1, wherein the access management module further comprises a signal filter to distinguish the tap signal from other movements detected by the accelerometer.

4. The access management system for an electronic device as claimed in claim 3, wherein the access management module further provides instructions to the microprocessor to disregard the tap signal if the tap signal exceeds a certain duration.

5. The access management system for an electronic device as claimed in claim 1, wherein:

the tap pattern is a locking pattern; and the access management module further provides instructions to the microprocessor to change the access state to a locked state if the tap signal completes the match, the locked state prohibiting access to at least one application operating on the electronic device.

6. The access management system for an electronic device as claimed in claim 1, wherein:

the tap pattern is an unlocking pattern; and the access management module further provides instructions to the microprocessor to change the access state to an unlocked state if the tap signal completes the match, the unlocked state allowing access to at least one application operating on the electronic device.

7. The access management system for an electronic device as claimed in claim 6, wherein the access management module further provides instructions to the microprocessor to provide for subsequent entry of a text password as part of a subsequent access request to enter a further access state of the electronic device providing access to at least one additional application operating on the electronic device.

8. The access management system for an electronic device as claimed in claim 1, wherein the tap pattern comprises at least two tap signals at first and second locations on a case of the electronic device.

9. The access management system for an electronic device as claimed in claim 1, wherein the described levels of movement include at least one of a light tap level, a medium tap level and any tap level.

10. The access management system for an electronic device as claimed in claim 1, wherein the described locations include at least one of a back of the electronic device, a front of the electronic device and a side of the electronic device.

11. A method for controlling access to applications operating on an electronic device, comprising:

generating a graphical user interface (GUI) providing a screen on a display of the electronic device that provides an interface for entry and modification of a tap pattern used to change an access state of the electronic device;

through the GUI, processing inputs from an input device on the electronic device that select described levels of movement and described locations for expected tap signals for the electronic device for the tap pattern, including a first level of movement and a second level of movement, where the second level of movement is larger than the first level of movement;

receiving signals from a monitoring circuit in the electronic device that processes tap signals from an accelerometer in the electronic device; and determining whether the tap signal completes a match for the tap pattern by utilizing a first peak value in the tap signal to compare against the tap pattern; and disregarding a second peak value following the first peak value in the tap signal for comparing against the tap pattern.

12. The method for controlling access to applications operating on an electronic device as claimed in claim 11, wherein the determining whether the tap signal completes the match comprises:

filtering the tap signal to isolate the tap signal from signals when the electronic device is being moved while it is being tapped.

13. The method for controlling access to applications operating on an electronic device as claimed in claim 12, wherein the determining whether the tap signal completes the match comprises:

disregarding the tap signal if the tap signal exceeds a certain duration.

14. The method for controlling access to applications operating on an electronic device as claimed in claim 11, further comprising:

changing the access state to a locked state if the tap signal completes the match, the locked state prohibiting access to at least one application operating on the electronic device.

15. The method for controlling access to applications operating on an electronic device as claimed in claim 11, further comprising:

changing the access state to an unlocked state if the tap signal completes the match, the unlocked state allowing access to at least one application operating on the electronic device.

16. The method for controlling access to applications operating on an electronic device as claimed in claim 15, further comprising:

providing subsequent entry of a text password as part of a subsequent access request to enter a further access state of the electronic device providing access to at least one additional application operating on the electronic device.

17. The method for controlling access to applications operating on an electronic device as claimed in claim 11, wherein the tap pattern comprises a series of positive and negative vibrating, degrading pulses.

18. The method for controlling access to applications operating on an electronic device as claimed in claim 11, wherein the tap pattern comprises at least two tap signals at first and second locations on a case of the electronic device.

* * * * *